(12) United States Patent
Leung et al.

(10) Patent No.: US 8,489,571 B2
(45) Date of Patent: Jul. 16, 2013

(54) DIGITAL RESOURCES SEARCHING AND MINING THROUGH COLLABORATIVE JUDGMENT AND DYNAMIC INDEX EVOLUTION

(75) Inventors: Clement Ho Cheung Leung, Hong Kong (HK); Jiming Liu, Hong Kong (HK)

(73) Assignee: Hong Kong Baptist University, Hong Kong (HK)

( * ) Notice: Subject to any disclaimer, the term of this patent is extended or adjusted under 35 U.S.C. 154(b) by 570 days.

(21) Appl. No.: 12/480,881

(22) Filed: Jun. 9, 2009

(65) Prior Publication Data
US 2010/0174730 A1 Jul. 8, 2010

Related U.S. Application Data

(60) Provisional application No. 61/060,459, filed on Jun. 10, 2008.

(51) Int. Cl.
*G06F 17/30* (2006.01)
(52) U.S. Cl.
USPC .......................................... 707/706; 707/707
(58) Field of Classification Search
USPC ................................. 707/706, 711, 723, 748
See application file for complete search history.

(56) References Cited

U.S. PATENT DOCUMENTS

| 6,571,239 B1 * | 5/2003 | Cole et al. ............................. 1/1 |
| 7,574,426 B1 * | 8/2009 | Ortega ................................... 1/1 |
| 2003/0050924 A1 * | 3/2003 | Faybishenko et al. ............ 707/3 |

* cited by examiner

*Primary Examiner* — Baoquoc N To
(74) *Attorney, Agent, or Firm* — Ella Cheong Hong Kong; Sam T. Yip

(57) ABSTRACT

A method is disclosed for a search engine or part of a search engine which utilizes collective intelligence, evaluation, and judgment, including web intelligence, to create and adapt the content of a generalized index hierarchy for digital resources to be searched. Digital resources to be searched can be stored and managed as a localized or distributed repository of images, video, audio, graphical or other multimedia data objects, as well as structured composite items, services, programs, modules, files, documents, systems, applications, networked peers, and agents, which may be difficult or costly to be indexed. In particular embodiments the claimed invention focuses on the indexing of semantic contents and/or pragmatic characteristics of such digital resources. By tracking and analyzing the searching behavior of users, proxies, and/or meta-search-engines, a search index can be created, tuned, improved and optimized. The claimed method in certain embodiments also incorporates an adaptive and evolution mechanism which allows relevant digital resources that may otherwise be overlooked to be found. The claimed invention can be applied to databases, web searching, personal/local search, community search, and broad-based or vertical search engines for internet, intranet, extranet or other uses.

15 Claims, 3 Drawing Sheets

Scenario of application:"Community search"

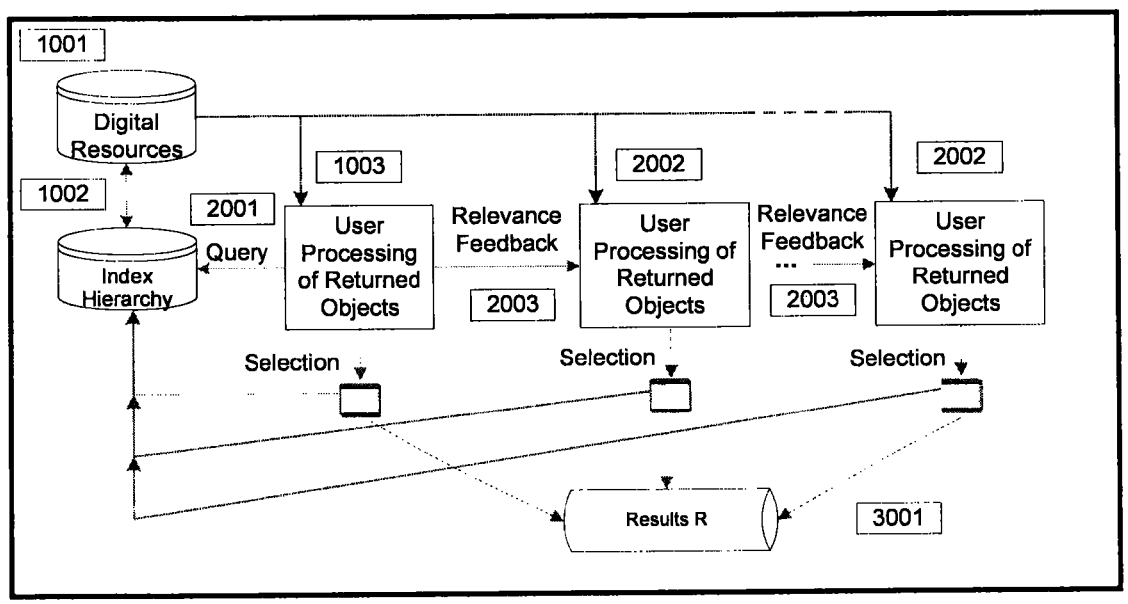
Figure 1. Iterative Retrieval with Relevance Feedback

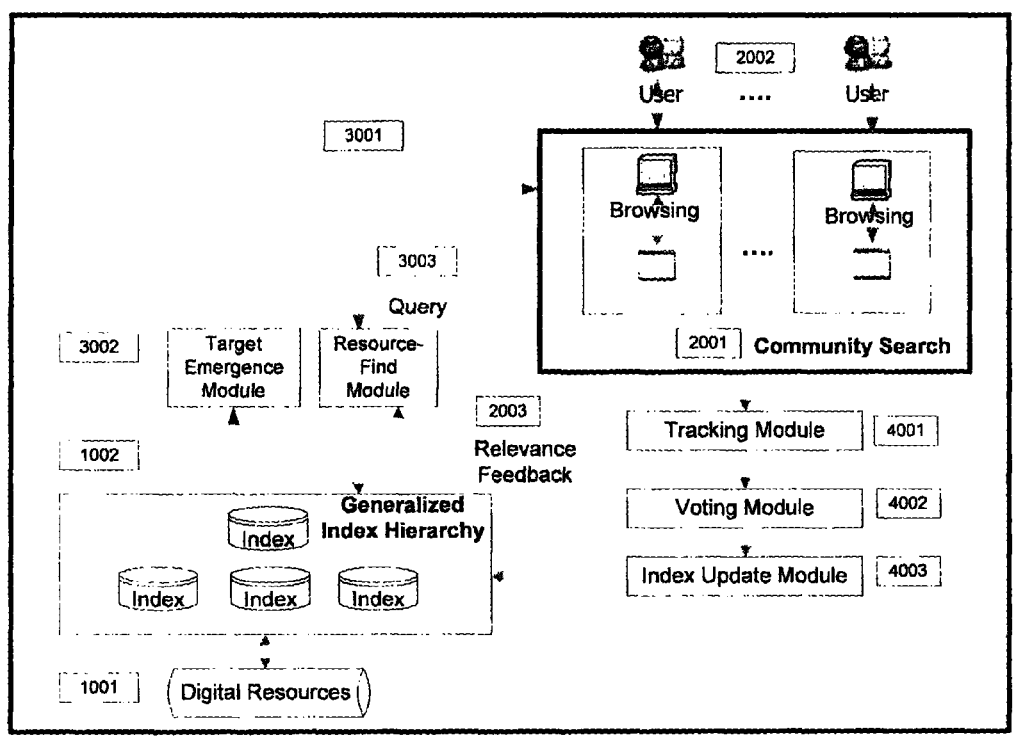
Figure 2. Scenario of application:"Community search"

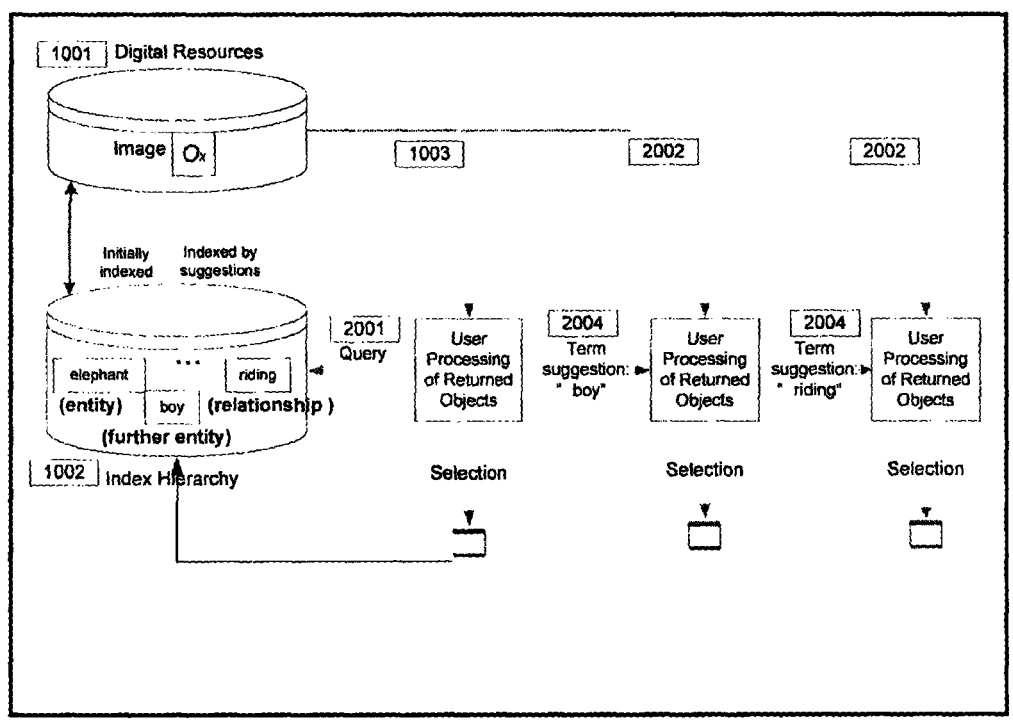
Figure 3 Incorporation of Rich Semantics into Digital Resources

DIGITAL RESOURCES SEARCHING AND MINING THROUGH COLLABORATIVE JUDGMENT AND DYNAMIC INDEX EVOLUTION

CROSS-REFERENCE TO RELATED APPLICATIONS

This application claims priority to and the benefit of U.S. Provisional Application No. 61/060,459 filed on Jun. 10, 2008, which is incorporated herein in its entirety by reference.

BRIEF SUMMARY OF THE INVENTION

The claimed invention relates to systems and processes useful for a search engine or part of a search engine which utilizes collective intelligence, including web intelligence, to modify the content of an index of information to be searched, for the purpose of enabling, improving or optimizing searching and search results. The presently claimed invention includes a robust and fault-tolerant mechanism that permits faulty indexing to be rectified over time. The claimed invention is applicable to web search, personal/local search, community search, broad-based or vertical search engines for internet, intranet, extranet or particular knowledge domains.

The semantic concepts and characteristics of multimedia data objects that are meaningful or of interest to humans are often not automatically extractable. Searching multimedia information may be divided into two main categories: "content-based" retrieval and "concept-based" retrieval; the former corresponds to features that are machine recognizable or extractable which may be of limited interest to humans, while the latter corresponds to concepts, characteristics or features which are meaningful and of interest to humans and may not be machine recognizable or extractable. Efficient indexing and retrieval of multimedia information are necessary for a successful multimedia searching system, and should identify object characteristics in a manner consistent with human perception. With technological limitations, it is not always possible to have machines automatically extracting semantic contents and some form of human involvement is usually necessary. Compared with automatic machine processing, the discovery and inclusion of new indexing terms using dedicated intensive manual indexing is always costly, laborious, time-consuming and unable to dynamically keep up with the creation rate of new digital resources. Similar situations exist in varying degrees for other forms of digital resources.

One aspect of the claimed invention relates to a method which supports the search of digital resources through selection voting and continuous indexing. The form of digital resources includes but is not limited to images, video clips, movies, music, songs, graphics, drawings, animations, or other multimedia information, as well as structured composite items, services, programs, modules, files, documents, systems, applications, networked peers, and agents. The system collects, analyzes and interprets users' search, relevance feedback and selection patterns for the purpose of discovering and migrating semantic concepts so that the system can build or modify the index of digital resources repositories automatically.

The claimed invention also includes a robust mechanism which analyzes human searching (usage) patterns to incorporate index evolution, for the purpose of rectifying index faults and to increase or decrease index scores over time which results in improvement of ranking of objects. The presently claimed invention also responds and adapts to changing usage patterns and perceptions.

In addition, the claimed invention incorporates a degree of non-determinism in the search results to support a greater variety of relevant target results to be incorporated in the target emergence module, and low scoring objects will be given a chance of being discovered.

As an example of the claimed invention, an illustrative embodiment undertakes the searching of the movie "The Prize" which starred the actor Paul Newman. For the illustration, it is assumed that only the term "Prize" has been indexed for this particular multimedia item. When a query is entered using the term "Prize", many objects of different types are to be returned, all of which will have the term "Prize" in their index. Among this set of results is the required movie "The Prize", and this is the only relevant object for the user. However, some queries may be more specific, with both "Prize" and "Paul Newman" specified, but the initial search results will still be the same as before as "Paul Newman" has not been indexed. The user will eventually select this movie, and this suggests that the term "Paul Newman" may also be included in the index of this movie. Thus "Paul Newman" would be included in the generalized index hierarchy for this movie. Thus, every time the terms "Prize" and "Paul Newman" are both specified in a query, and if the user subsequently selects the movie, the index score of this new term "Paul Newman" will be increased. When this score reaches the required threshold, then "Paul Newman" will be installed as a proper index term of this movie. Similarly, other terms may be added to the index in a dynamic way.

In an illustrative embodiment the movie "The Prize" ($O_p$) is initially indexed with an index term "Prize" ($T_1$), having initial index score $S_1=30$. When a user enters a query $Q_1(T_1)$ with only one term $T_1$, a set of results $R_1=\{O_1, \ldots, O_p, \ldots, O_k\}$ which consists of the multimedia data objects that are indexed with $T_1$ would be returned. From time to time, some users may enter a more specific query $Q_2(T_1, T_2)$, with both "Prize" ($T_1$) and "Paul Newman" ($T_2$) as query terms to find $O_p$. Assume this returns the results $R_2$ which include $O_p$. Eventually, a user selects $O_p$ in $R_2$, and this suggests that $T_2$ should be included in the index of $O_p$. Through the user selection, the index score $S_1$ of $T_1$ for $O_p$ would be increased by a pre-defined value $\Delta_+$. In the illustrative embodiment, take $\Delta_+$ to be 3. Thus, the value of $S_1$ becomes 33 after a user has selected it once. Meanwhile, the new index term ($T_2$) is then included in the index of $O_p$ at the lowest level in the index hierarchy with a pre-defined entry score of, say, 10; i.e. $S_2=10$ at this point. Subsequently, with every query consisting of the index terms $T_1$ and $T_2$, and if the user then selects $O_p$, the index score $S_2$ for $O_p$ would be increased by $\Delta_+=3$ for each such selection. Assuming the required threshold for proper installation into the index is $\lambda=20$, the index score $S_2$ for $O_p$ would reach 22 after four selections. Since this value exceeds $\lambda=20$, the new index term $T_2$ would be properly included in the index of the movie $O_p$.

An important operating aspect in one embodiment of the claimed invention is that human users—through their considerable time spent in interacting with the system and their visual judgment—have progressively transferred and instilled their intelligence and perceptions into the system so that the index of digital resources is gradually enriched, which cannot be achieved by purely automatic means as current technology does not allow semantic contents of many digital resources to be meaningfully recognized. In this way, richer object semantics, such as "entities" and "relationships", may be incorporated into the query processing algorithms of digital resources. In another anticipated variant, a generalized index hierarchy is envisioned which is conceptual. "Conceptual" means that it is not tied to particular forms of physical structure.

As an illustrative example of the claimed invention as further depicted in FIG. 3, an image with a boy riding on an elephant is initially minimally indexed with only the term "elephant" (an entity). As time goes on, using the mechanisms indicated above, "boy" (a further entity) will be added to the index of the image. Still later, the term "riding" (relationship) will also be added. Thus, after progressive usage, the three terms "boy", "riding", "elephant" (representing entities and relationship) will all be part of the index of this particular image, even though at the beginning, only "elephant" is in the index, and through the inclusion of all three terms in a query, a much more precise retrieval can occur, reducing time and effort in navigating a large number of irrelevant objects. Similarly, attributes for entities such as "brown elephant", or "happy boy" may be incorporated, resulting in "happy boy", "riding", "brown elephant".

In order to provide a robust and resilient search mechanism, the claimed search method in certain embodiments introduces small degrees of Stochastic Perturbations (SP) so as to allow constructive variations in the result. The introduction of Stochastic Perturbations allow objects which may be obscured or hidden to be discovered, as well as provide the possibility of obtaining new results in repeated searches. In such a mechanism, the ranking of query results need not be done strictly according to the score value. A probability may be assigned to an object, which may be used to probabilistically determine a probabilistic placement of its position in the search results. Such a probability may or may not be related to the score of the object. In the former where the probability is a monotonically increasing function of the score value, then the object with the higher score value would have greater probability of attaining a more prominent position in the query results. Stochastic perturbations are incorporated into the target emergence module.

More precisely, suppose there are M expected objects that fulfill a search query, and suppose the probability value of each object $O_j$ can be determined by its corresponding query score $S_j$. Without SP, objects are strictly ranked by the query score $S_j$ in a descending order. After applying SP, an object with a low query score $S_j$ would also have a chance to be ranked at the top of the query result list since the object ranking is determined by the stochastic properties of SP. It is thus possible to have an object $O_k'$ with score $S_k'$ ranked higher than an object $O_m'$ with score $S_m'$, where $S_k' < S_m'$.

Aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE SEVERAL VIEWS OF THE DRAWING

The invention of the present application will now be described in more detail with reference to preferred embodiments of the architecture and method, given only by way of example, and with reference to the accompanying drawings, in which:

FIG. 1 illustrates a conceptual block diagram of how the index hierarchy is updated by iterative retrieval with relevance feedback.

FIG. 2 illustrates a conceptual block diagram of the system used for "community search."

FIG. 3 illustrates the incorporation of rich semantics into digital resources.

DETAILED DESCRIPTION OF THE INVENTION

The presently claimed invention relates generally to architectures and methods to improve ranking and searching of digital resources by incorporating human intelligence through dynamic index evolution. Accordingly, the drawings and descriptions are to be regarded as illustrative in nature, and not as restrictive.

The presently claimed invention is particularly useful for handling multimedia data objects where automatic recognition of semantic contents and hence their automatic indexing is not feasible or possible. A semi-automatic evolutionary approach with human perception is designed; this will obviate the need to perform time-consuming, dedicated, intensive manual indexing which has shown to be costly and, if done by a small unrepresentative group, also produces a biased and subjective indexing structure.

FIG. 1 depicts a general block diagram to illustrate the system which tracks users' searching behavior through the mechanism of iterative retrieval with relevance feedback. The system includes a repository (1001) of digital resources, which may consist of one or many types of objects. Such information need not be stored in a single location, but can be distributed over many different locations. The objects are indexed by a generalized index hierarchy (1002), which may contain one or more levels. In one illustrative embodiment, a user issues a query (2001) including a query term T, where T may or may not be the only term in the query. Then typically all objects having that term in the generalized index hierarchy will be included in the retrieval results (1003), suitably ranked, organized, and presented to the user, though not all of them will be considered relevant to this query by the user. In typical multimedia item retrieval, the user will go through a number of iterations using relevance feedback (2003). The relevance feedback can cause digital resources not present in previous set(s) of returned objects to be retrieved from the digital resources repository (2002). The following explains the voting mechanism.

Referring to FIG. 1, the final selected results R (3001) may include three sets:

1. $S_2$, a set of objects having the index term T is present in the top level $L_N$ of its generalized index hierarchy;
2. $S_1$, a set of objects having the index term T is present in one of the levels $L_1, L_2, \ldots, L_{N-1}$ of its generalized index hierarchy, where the hierarchy consists of more than one level;
3. $S_0$, a set of objects where the index term T is absent from any of the levels of the generalized index hierarchy.

Consequently, $$R = S_2 \cup S_1 \cup S_0$$

For objects in $S_2$ and $S_1$, their score of T is incremented by a pre-determined amount $\Delta$. This may cause the promotion of T to the next higher level of the hierarchy as appropriate. For objects in $S_0$, the index term T will be added to the lowest level of the generalized index hierarchy with an initial score of $P_1$. In the illustrative embodiment of FIG. 1, a fix amount of increase $\Delta$ is used. In general cases, different amounts may be incremented depending on which stage the image is selected for inclusion in the final results.

In the illustrative embodiment, $U_T$ is the set of objects having the term T at some level in the generalized index hierarchy. Some objects of $U_T$ may not be included in the final selected results R which indicates that term T may not be very useful as an index term for that object. Possible reasons may be that the particular feature described by term T is not sufficiently prominent or significant in the multimedia object. Thus, denoting the score of T by |T|, for objects in the set $U_T-R$, the following can occur:

1. $|T| \geq P_1+\Delta$ in which case |T| is decremented by the amount $\Delta$, and the updated |T| is still greater than $P_1$ after the decrement, and hence remained in the generalized index hierarchy,
2. $|T|<P_1+\Delta$ in which case |T| is decremented by the amount $\Delta$, and the updated |T| is less than $P_1$ after the decrement, and hence it will be dropped from the generalized index hierarchy.

Referring now to FIG. 2, it is a general block diagram to illustrate the system in which the invention can be used for "community search", which is also applicable to different forms of Internet search including "personal search" "broad-based search", or "vertical search" for a particular knowledge domain.

The disclosed system includes a repository (1001) of digital resources, which may consist of one or many types of objects. Such information need not be stored in a single location, but in some embodiments can be distributed over many different locations. The objects are indexed by a generalized index hierarchy (1002). For community search (2001), search queries are issued by the users (2002). These queries are processed by the resource-find module (3003), which makes use of the generalized index hierarchy to locate the objects of interest. The results of queries (3001) will be returned and displayed or appropriately played through a user interface such as a web browser with the results appropriately organized and presented by the target emergence module. Depending on the users' perception and judgment, item(s) among the returned result which users consider of interest will be selected and browsed or processed for obtaining further results as appropriate. Such iterative activities of relevance feedback will be tracked by a tracking module (4001). The users' search, relevance feedback and selection patterns will be processed by a voting module (4002) with a robust scoring mechanism, which will be used to update the generalized index hierarchy by an index update module (4003). The relevance feedback (2003) may also trigger the resource-find module to find further objects and these will be sent to the users. In a reasonable time period through such a dynamic index evolution, information relevant to the interest of the community will be indexed.

FIG. 3 provides a further illustration. The system includes a repository (1001) of digital resources, which consist of an image $O_x$ of a boy riding on an elephant. $O_x$ is initially indexed with an index term $T_1$ "elephant" (an entity). The index term $T_1$ is one of the index terms in the generalized index hierarchy (1002), which may contain one or more levels. When a user enters a query (2001) including $T_1$, all objects having that term in the generalized index hierarchy will be included in the retrieval results (1003). Subsequently, queries with additional terms are entered followed by selections, and using the aforementioned mechanism of installing new terms in the index, new index terms (2004) $T_2$ "boy" (a further entity) and $T_3$ "riding" (a relationship) are included in the index of $O_x$, and results (2002) which consist of more specific index terms would be returned in response to more specific queries.

While the claimed invention has been described in detail with reference to preferred embodiments thereof, it will be apparent to one skilled in the art that various changes can be made, and equivalents employed, without departing from the scope of the invention.

What is claimed is:

1. A computer processor implemented method for indexing, searching digital data groups, and generating search results thereof comprising:
   constructing, by a computer processor, a preliminary index of digital data groups;
   structuring, by a computer processor, the preliminary index into a generalized index hierarchy;
   incorporating, by a computer processor, a scoring value for each index term in the generalized index hierarchy;
   updating, by a computer processor, the generalized index hierarchy as a result of users querying the digital data groups and subsequent selection patterns, comprising:
      creating one or more new index terms based on one or more query terms used in the users queries;
      removing one or more existing index terms based on one or more query terms used in the users queries; and
      incorporating a stochastic means to generate constructive variations in the search results; and
   organizing, by a computer processor, the search results according to information in the generalized index hierarchy.

2. The method of claim 1 additionally comprising the step of guiding search queries based on score values in the generalized index hierarchy after the step of updating the generalized index hierarchy with semantic and context specific elements.

3. The method of claim 2 additionally comprising the step of voting to determine one or more scores for ranking digital resources in said generalized index hierarchy.

4. The method of claim 3 additionally comprising the step of tracking to gather user specific search queries, relevance feedback data and results selection patterns.

5. The method of claim 4 wherein said tracking step is followed by the step of compiling and indexing said patterns.

6. The method of claim 5 wherein said voting step is determined by final results R, wherein $R=S_2 \cup S_1 \cup S_0$ where $S_2$ is a set of objects having index term T present in the top level $L_N$ of its generalized index hierarchy, $S_1$ is a set of objects having the index term T is present in one of the levels $L_1, L_2, \ldots, L_{N-1}$ of its generalized index hierarchy with more than one level and $S_O$ is a set of objects where the index term T is absent from any of the levels of the generalized index hierarchy.

7. The method of claim 6 wherein the score of T is incremented by a pre-determined amount $\Delta$ for $S_1$ and $S_2$.

8. The method of claim 1 wherein said digital data groups are selected from the group consisting of multimedia data objects, services, programs, modules, files, documents, systems, applications, networked peers, and agents.

9. The method of claim 1 wherein said generalized index hierarchy contains one or more levels additionally comprises sub-indexes.

10. The method of claim 1 wherein said generalized index hierarchy is a conceptual generalized index hierarchy.

11. The method of claim 10 wherein said generalized index hierarchy is not tied to particular forms of physical structure.

12. The method of claim 1 wherein said generalized index hierarchy is a physically implemented generalized index hierarchy.

13. A multimedia searching system comprising:
   a content generalized index hierarchy of one or more conceptual levels, maintained by one or more computer processors, for incorporating index terms pointing to digital resources, wherein each level of the content generalized index hierarchy containing score data with a lower value and an upper value denoting lower and upper boundaries of the levels respectively;

a tracking module, executed by one or more computer processors, for collecting and analyzing searching behavior;

a voting module, executed by one or more computer processors, for computing votes accumulated for each index term;

an index update module, executed by one or more computer processors, for dynamically re-calibrating score values and positions associated with each index term, creating one or more new index terms based on one or more query terms used in users queries, removing one or more existing index terms based on one or more query terms used in users queries; and a stochastic perturbations module, executed by one or more computer processors, for generating constructive variations in search results.

14. The content searching system of claim 13 wherein said index update module triggers upward movement, downward movement and sideways movement of an index term in a content generalized index hierarchy determines the number and precision of index terms of a digital resource.

15. The system of claim 13 additionally comprising:

a resource-find module, executed by one or more computer processors, for extracting semantic judgments encapsulated in the generalized index hierarchy to locate target digital resources; and a target emergence module, executed by one or more computer processors, for determining organization and presentation of search results.

* * * * *